US012579844B2

(12) United States Patent
Guo et al.

(10) Patent No.: US 12,579,844 B2
(45) Date of Patent: Mar. 17, 2026

(54) GESTURE RECOGNITION METHOD AND APPARATUS, ELECTRONIC DEVICE, READABLE STORAGE MEDIUM, AND CHIP

(71) Applicant: VIVO MOBILE COMMUNICATION CO., LTD., Dongguan (CN)

(72) Inventors: Hua Guo, Dongguan (CN); Fangqin Mao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 344 days.

(21) Appl. No.: 18/222,476

(22) Filed: Jul. 16, 2023

(65) Prior Publication Data

US 2023/0360443 A1 Nov. 9, 2023

Related U.S. Application Data

(63) Continuation of application No. PCT/CN2021/143855, filed on Dec. 31, 2021.

(30) Foreign Application Priority Data

Jan. 15, 2021 (CN) .......................... 202110057731.X

(51) Int. Cl.
 *G06V 40/20* (2022.01)
 *G06T 7/73* (2017.01)
 *G06V 10/82* (2022.01)
(52) U.S. Cl.
 CPC ................ *G06V 40/28* (2022.01); *G06T 7/74* (2017.01); *G06V 10/82* (2022.01);
 (Continued)
(58) Field of Classification Search
 CPC .................... G06N 3/0499; G06N 3/09; G06T 2207/20081; G06T 2207/20084;
 (Continued)

(56) References Cited

U.S. PATENT DOCUMENTS 10,311,833 B1 * 6/2019 Qiu ........................ G09G 5/003
2014/0361981 A1 12/2014 Kamamori
 (Continued)

FOREIGN PATENT DOCUMENTS

CA 2748037 A1 * 8/2010 ............. G06V 20/64
CA 3038031 A1 * 4/2018 ............. G06V 10/82
 (Continued)

OTHER PUBLICATIONS

Mokhtar M. Hasan et al., "Hand Gesture Modeling and Recognition using Geometric Features: A Review," Mar. 2012, Canadian Journal on Image Processing and Computer Vision vol. 3 No. 1, Mar. 2012, pp. 12-23.*
 (Continued)

*Primary Examiner* — Omar S Ismail
(74) *Attorney, Agent, or Firm* — IPX PLLC

(57) ABSTRACT

A gesture recognition method is provided, including: obtaining a sub-image of a hand region in a target image, and determining multiple pieces of feature point position information corresponding to multiple feature points in the sub-image of the hand region; determining a first position feature vector based on the multiple pieces of feature point position information, where the first position feature vector represents a relative position relationship of any one of the multiple feature points relative to remaining feature points in the multiple feature points; determining a second position feature vector based on the multiple pieces of feature point position information, where the second position feature vector represents an absolute position relationship of the multiple feature points in the sub-image of the hand region; and outputting a recognition result of the sub-image of the hand region based on the first position feature vector and the second position feature vector.

20 Claims, 17 Drawing Sheets

(52) U.S. Cl.
CPC ............... *G06T 2207/20081* (2013.01); *G06T 2207/20084* (2013.01); *G06T 2207/30196* (2013.01)

(58) Field of Classification Search
CPC . G06T 2207/30196; G06T 7/74; G06V 10/82; G06V 40/113; G06V 40/28
See application file for complete search history.

(56) References Cited

U.S. PATENT DOCUMENTS

| | | | | |
|---|---|---|---|---|
| 2016/0171340 A1* | 6/2016 | Fleishman | ............. | G06V 40/28 |
| | | | | 382/159 |
| 2019/0180149 A1* | 6/2019 | Knittel | ................. | G06N 3/0464 |
| 2020/0043287 A1* | 2/2020 | Zhang | .................... | G06V 20/52 |
| 2020/0125234 A1* | 4/2020 | Lee | ......................... | G06F 18/21 |
| 2020/0225354 A1* | 7/2020 | Schindler | ............... | G01S 17/89 |
| 2021/0004589 A1* | 1/2021 | Turkelson | ............ | G06V 10/809 |
| 2022/0121884 A1* | 4/2022 | Zadeh | .................... | G06N 3/006 |

FOREIGN PATENT DOCUMENTS

| | | | | | |
|---|---|---|---|---|---|
| CN | 111126339 A | | 5/2020 | | |
| CN | 111158478 A | | 5/2020 | | |
| CN | 112699849 A | | 4/2021 | | |
| EP | 4273745 A1 | * | 11/2023 | ............. | G06V 40/28 |
| GB | 2551239 A | * | 12/2017 | ............... | G06T 7/20 |

OTHER PUBLICATIONS

Xiaoyu Wu et al., "An Intelligent Interactive System Based on Hand Gesture Recognition Algorithm and Kinect," Jan. 10, 2013, 2012 Fifth International Symposium on Computational Intelligence and Design , pp. 294-297.*
Feng Li et al., "Gesture recognition algorithm based on image information fusion in virtual reality," May 2, 2019, Personal and Ubiquitous Computing (2019), pp. 487-495.*
Umar Iqbal et al. ,"Hand Pose Estimation via Latent 2.5D Heatmap Regression," Sep. 2018, Proceedings of the European Conference on Computer Vision (ECCV), 2018, May 2021, pp. 1-11.*
Tzu-Yang Chen et al., "Learning a deep network with spherical part model for 3D hand pose estimation," Feb. 27, 2018, Pattern Recognition 80 (2018) , pp. 1-17.*
Claudia Nolker et al., "Visual Recognition of Continuous Hand Postures," Jul. 31, 2002, IEEE Transactions on Neural Networks, vol. 13, Issue: 4, Jul. 2002, pp. 155-175.*
Extended European Search Report issued in related European Application No. 21919188.9, mailed Apr. 17, 2024, 6 pages.
Lin Fanqing et al: "Two-hand Global 3D Pose Estimation using Monocular RGB", 2021 IEEE Winter Conference on Applications of Computer Vision (WACV), IEEE, Jan. 3, 2021, pp. 2372-2380, XP033926251, 9 pages.
Iqbal Umar et al: "Hand Pose Estimation via Latent 2.5D Heatmap Regression", Oct. 6, 2018, Oct. 6, 2018, pp. 125-143, XP047635293, 19 pages.
Chen Tzu-Yang et al: "Learning a deep network with spherical part model for 3D hand pose estimation", Pattern Recognition, Elsevier, GB, vol. 80, Feb. 27, 2018, pp. 1-20, XP085388295.
Second Office Action issued in in related Chinese Application No. 202110057731.X, mailed May 18, 2024, 4 pages.
Decision of Rejection issued in in related Chinese Application No. 202110057731.X, mailed Aug. 9, 2024, 5 pages.
International Search Report issued in corresponding International Application No. PCT/CN2021/143855, mailed Apr. 7, 2022, 4 pages.

* cited by examiner

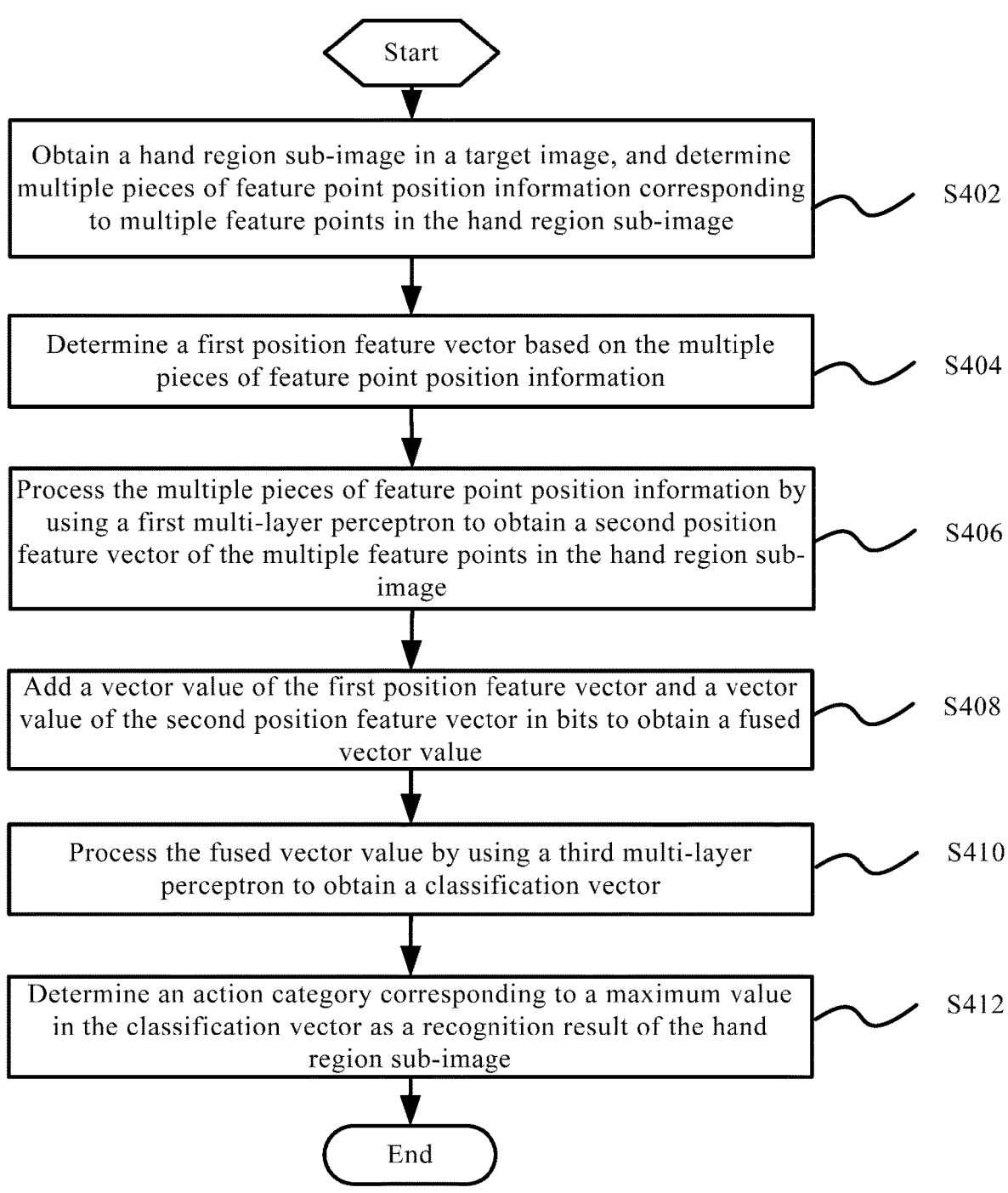

Start

Obtain a hand region sub-image in a target image, and determine multiple pieces of feature point position information corresponding to multiple feature points in the hand region sub-image ⟶ S402

Determine a first position feature vector based on the multiple pieces of feature point position information ⟶ S404

Process the multiple pieces of feature point position information by using a first multi-layer perceptron to obtain a second position feature vector of the multiple feature points in the hand region sub-image ⟶ S406

Add a vector value of the first position feature vector and a vector value of the second position feature vector in bits to obtain a fused vector value ⟶ S408

Process the fused vector value by using a third multi-layer perceptron to obtain a classification vector ⟶ S410

Determine an action category corresponding to a maximum value in the classification vector as a recognition result of the hand region sub-image ⟶ S412

End

GESTURE RECOGNITION METHOD AND APPARATUS, ELECTRONIC DEVICE, READABLE STORAGE MEDIUM, AND CHIP

CROSS-REFERENCE TO RELATED APPLICATIONS

This application is a continuation of International Application No. PCT/CN2021/143855, filed Dec. 31, 2021, which claims priority to Chinese Patent Application No. 202110057731.X, filed Jan. 15, 2021. The entire contents of each of the above-referenced applications are expressly incorporated herein by reference.

TECHNICAL FIELD

This application relates to the field of image recognition technologies, and more particularly, to a gesture recognition method, a gesture recognition apparatus, an electronic device, a readable storage medium, and a chip.

BACKGROUND

Currently, in addition to common touch screen interaction, gesture-based interaction has been paid increasingly more attention to in human-computer interaction of a mobile end user. With the development of Augmented Reality (AR) and Virtual Reality (VR) capabilities of a mobile phone, gesture interaction gradually becomes an irreplaceable trend. Currently, gesture recognition is mainly divided into two types: gesture recognition based on an original red, green, and blue color mode (RGB color mode) image and gesture recognition based on a key point of a hand. In the gesture recognition based on the original RGB image, a category of a gesture is obtained by directly classifying an image of an obtained gesture region picture, and in the gesture recognition based on the key point of the hand, a category of a gesture is obtained by performing modeling by using a position relationship of 21 key points of the hand. However, in the foregoing recognition methods, there is still a problem of low recognition accuracy.

SUMMARY

This application discloses a gesture recognition method, a gesture recognition apparatus, an electronic device, a readable storage medium, and a chip.

A first aspect of this application provides a gesture recognition method, including: obtaining a sub-image of a hand region in a target image, and determining multiple pieces of feature point position information corresponding to multiple feature points in the sub-image of a hand region; determining a first position feature vector based on the multiple pieces of feature point position information, where the first position feature vector represents a relative position relationship of any one of the multiple feature points relative to remaining feature points in the multiple feature points; determining a second position feature vector based on the multiple pieces of feature point position information, where the second position feature vector represents an absolute position relationship of the multiple feature points in the sub-image of a hand region; and outputting a recognition result of the sub-image of a hand region based on the first position feature vector and the second position feature vector.

A second aspect of this application provides a gesture recognition apparatus, including: an obtaining unit, configured to: obtain a sub-image of a hand region in a target image, and determine multiple pieces of feature point position information corresponding to multiple feature points in the sub-image of a hand region; a feature determining unit, configured to determine a first position feature vector and a second position feature vector based on the multiple pieces of feature point position information, where the first position feature vector represents a relative position relationship of any one of the multiple feature points relative to remaining feature points in the multiple feature points, and the second position feature vector represents an absolute position relationship of the multiple feature points in the sub-image of a hand region; and an output unit, configured to output a recognition result of the sub-image of a hand region based on the first position feature vector and the second position feature vector.

A third aspect of this application provides an electronic device including a processor, a memory, and a program or an instruction that is stored in the memory and that can be run on the processor, and when the program or the instruction is executed by the processor, the steps of the gesture recognition method in the first aspect are implemented.

A fourth aspect of this application provides a readable storage medium. The readable storage medium stores a program or an instruction, and the program or the instruction is executed by a processor to implement the steps of the gesture recognition method in the first aspect.

A fifth aspect of this application provide a chip including a processor and a communication interface. The communication interface is coupled to the processor, and the processor is configured to run a program or an instruction to implement the steps of the gesture recognition method in the first aspect.

Additional aspects and advantages of this application will become apparent in the following descriptions, or may be learned from practice of this application.

BRIEF DESCRIPTION OF DRAWINGS

The foregoing and/or additional aspects and advantages of this application will become apparent and readily understandable from the descriptions of the embodiments with reference to the following accompanying drawings.

FIG. 8 is a fourth flowchart of a gesture recognition method according to an embodiment of this application;

DETAILED DESCRIPTION

The following describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first", "second", and the like in the descriptions and the claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specifications and the claims, "and/or" represents at least one of connected objects, and a character "/" generally represents an "or" relationship between associated objects.

With reference to the accompanying drawings, a gesture recognition method, a gesture recognition apparatus, an electronic device, and a readable storage medium provided in the embodiments of this application are described in detail by using specific embodiments and application scenarios.

Figure 1:
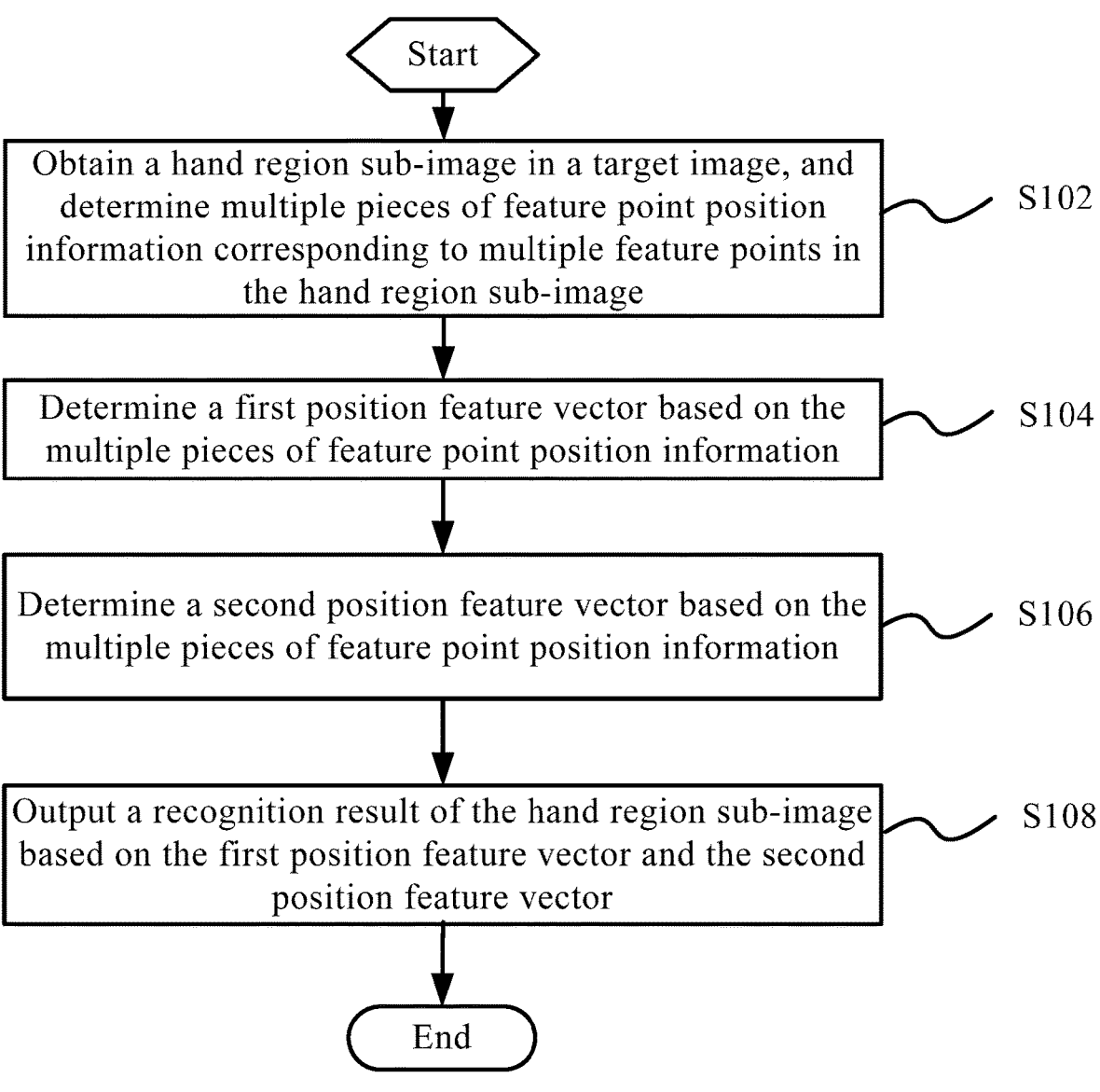
FIG. 1 is a first flowchart of a gesture recognition method according to an embodiment of this application.

A gesture recognition method is proposed in an embodiment in a first aspect of this application. FIG. 1 is a schematic flowchart of a gesture recognition method according to an embodiment of this application. The gesture recognition method in this embodiment of this application includes:

Step S102: Obtain a sub-image of a hand region in a target image, and determine multiple pieces of feature point position information corresponding to multiple feature points in the sub-image of a hand region.

Step S104: Determine a first position feature vector based on the multiple pieces of feature point position information.

Step S106: Determine a second position feature vector based on the multiple pieces of feature point position information.

Step S108: Output a recognition result of the sub-image of a hand region based on the first position feature vector and the second position feature vector.

In this embodiment of this application, the sub-image of a hand region in the target image is obtained first. For example, M target images may be obtained in any manner. For example, M target images in any format and size may be obtained through network downloading, camera shooting, video capturing, or the like. Before recognition of the feature points, the M target images may be detected to obtain target regions in the M target images, that is, hand regions, and then N sub-image of a hand regions are extracted. In a subsequent recognition process, only feature points need to be extracted from the sub-image of a hand regions, and position information of the feature points need to be positioned, so that a recognition range can be reduced, a calculation amount in the recognition process can be reduced, and recognition accuracy and recognition efficiency can be improved. Because skeletal traction is required to complete a hand action, in this embodiment of this application, an articulatio point is used as the feature point in the sub-image of a hand region, and an action category is accurately recognized by using the feature points, to determine a recognition result.

After the position information of the multiple feature points in the sub-image of a hand regions is determined, the first position feature vector is determined based on the determined feature point position information, the first position feature vector represents a relative position relationship of any one of the multiple feature points with respect to remaining feature points in the multiple feature points, and the second position feature vector represents an absolute position relationship of the multiple feature points in the sub-image of a hand region. Then, the recognition result of the sub-image of a hand region is determined based on the first position feature vector and the second position feature vector.

Figures 2, 3:
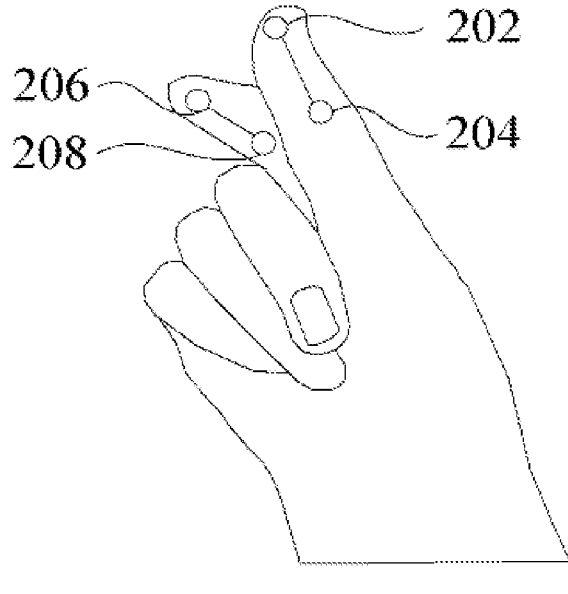
FIG. 2 shows a first sub-image of a hand region obtained at different viewing angles.
FIG. 3 shows a second sub-image of a hand region obtained at different viewing angles.
Figure 4:
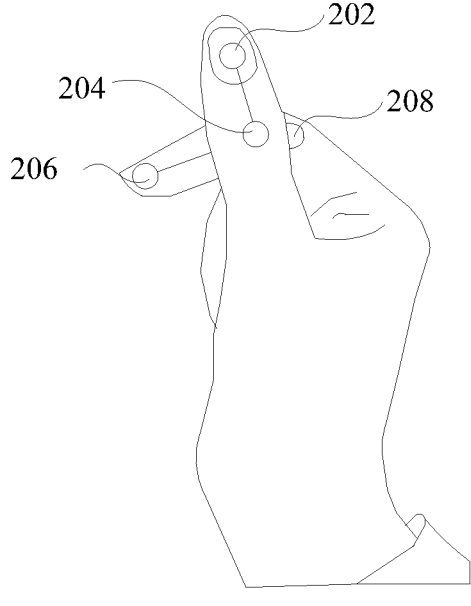
FIG. 4 shows a third sub-image of a hand region obtained at different viewing angles.

As shown in FIG. 2, FIG. 3, and FIG. 4, because viewing angles for obtaining the sub-image of a hand regions are different, relative relationships of feature points in images shot for a same hand gesture are also different. For example, a line connecting a first feature point 202 and a second feature point 204 of the thumb has a different angular relationship with a line connecting a third feature point 206 and a fourth feature point 208 of the index finger, and a relationship between hand gestures in three-dimensional space changes relative to the relative position relationship of the feature points in the images obtained from different viewing angles. The first position feature vector in this embodiment of this application shows a relative position relationship of multiple feature points, and rules out impact exerted by different viewing angles on recognition of the action category, that is, for a same action, first position feature vectors of the multiple feature points obtained after the sub-image of a hand region is obtained and the multiple feature points are determined are identical regardless of viewing angles for obtaining the target image. The second position feature vector retains absolute positions of the multiple feature points in the sub-image of a hand region, and the action category of the sub-image of a hand region is finally obtained by comprehensively judging the first position feature vector and the second feature position, that is, combining relative positions of the multiple feature points with absolute positions of the feature points in the image. According to this gesture recognition method, the relative position relationship of the multiple feature points and the absolute position relationship of the multiple feature points in the sub-image of a hand region are considered, so that a problem of misrecognition in various cases in which viewing angles are changing is effectively resolved, and the stability of action recognition is improved.

Figure 5:
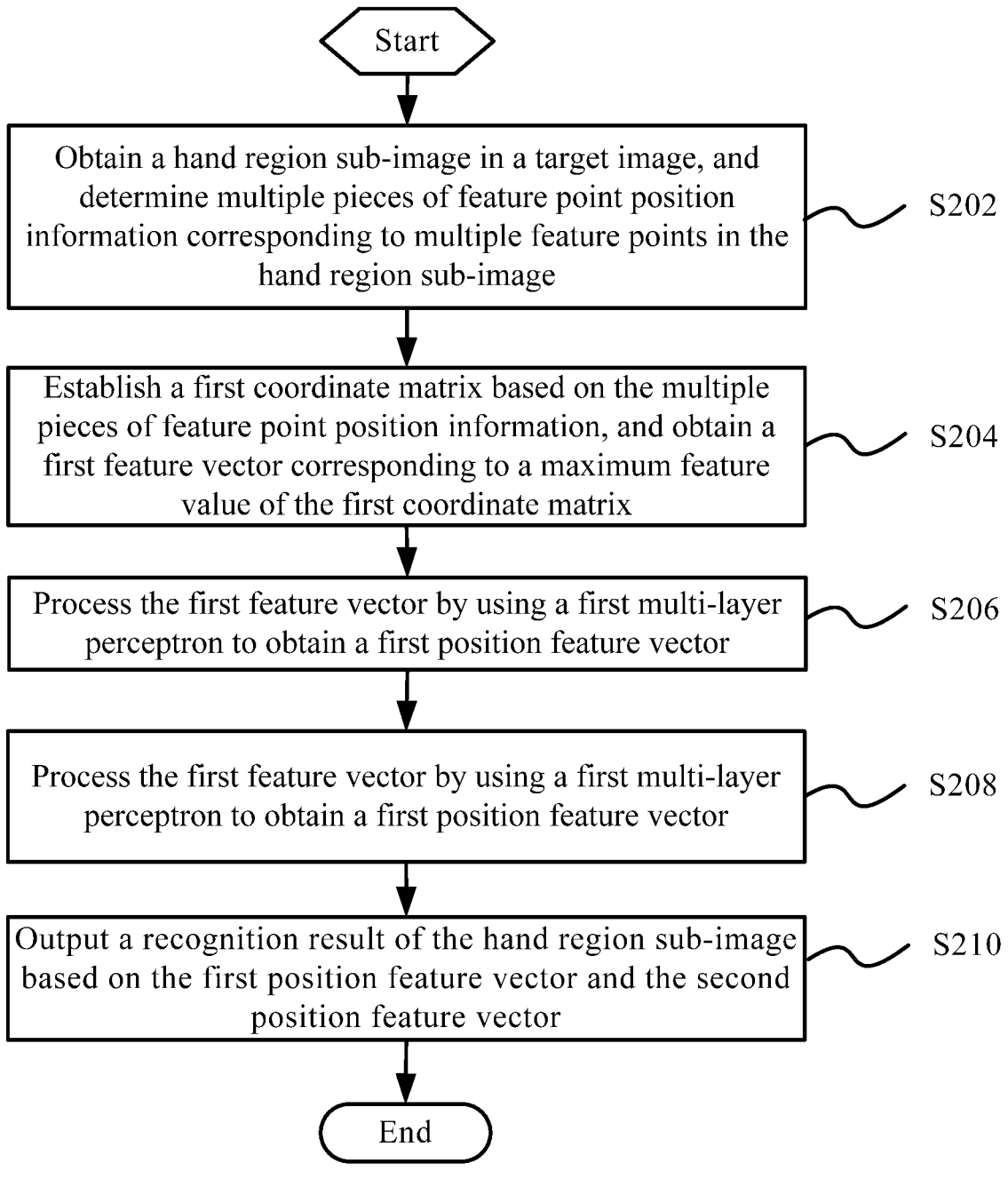
FIG. 5 is a second flowchart of a gesture recognition method according to an embodiment of this application.

FIG. 5 is a schematic flowchart of a gesture recognition method according to an embodiment of the first aspect of this application. The method includes the following steps:

Step S202: Obtain a sub-image of a hand region in a target image, and determine multiple pieces of feature point position information corresponding to multiple feature points in the sub-image of a hand region.

Step S204: Establish a first coordinate matrix based on the multiple pieces of feature point position information, and obtain a first feature vector corresponding to a maximum feature value of the first coordinate matrix.

Step S206: Process the first feature vector by using a first multi-layer perceptron to obtain a first position feature vector.

Step S208: Process the multiple pieces of feature point position information by using a second multi-layer perceptron to obtain a second position feature vector of the multiple feature points in the sub-image of a hand region.

Step S210: Output a recognition result of the sub-image of a hand region based on the first position feature vector and the second position feature vector.

In these embodiments, after position information of the multiple feature points is determined, the first coordinate matrix is established based on the position information of the multiple feature points, and the first feature vector corresponding to the maximum feature value of the first coordinate matrix is obtained through calculation. The first feature vector is introduced to facilitate subsequent operations. The obtained first feature vector is processed by using the first multi-layer perceptron, and impact exerted by the viewing angle on determining of the action category is ruled out, so that the relative position relationship of the multiple feature points can be accurately determined at different viewing angles.

In some embodiments, an element in the first coordinate matrix is a Euclidean distance between any one of the multiple feature points and any one of remaining feature points in the multiple feature points.

In these embodiments, a Euclidean distance between feature points is used as the element in the first coordinate matrix, and the Euclidean distance may represent a true distance between two points in multidimensional space. Therefore, in these embodiments, the Euclidean distance is used in the first coordinate matrix instead of a plane distance of the feature points in a direction perpendicular to a photographing device, so that a problem of authenticity of determining of the distance between any one of the multiple feature points and any one of remaining feature points in the multiple feature points in different viewing angles can be effectively resolved, and thus an actual relative positional relationship of the multiple feature points in the three-dimensional space can be accurately obtained.

In some embodiments, the first coordinate matrix is an upper triangular matrix.

For example, an element in the first coordinate matrix is a relative distance between a feature point corresponding to a row in which the first coordinate matrix is located and a feature point corresponding to a column in which the first coordinate matrix is located. For example, an element in a third column and a second row of the matrix may represent a relative distance between a second feature point and a third feature point, and an element in a second column and a third row of the matrix may represent a relative distance between the third feature point and the second feature point. It can be learned that values of the two elements are repeated, and a large quantity of repeated elements increases operation complexity. Therefore, in these embodiments, the established first coordinate matrix is a multi-dimensional upper triangular matrix, elements at the bottom left of a diagonal of the first coordinate matrix are all 0, and elements at the top right of the diagonal are the relative distance between the feature point corresponding to the row in which the first coordinate matrix is located and the feature point corresponding to the column in which the first coordinate matrix is located, thereby simplifying an operation process.

Figure 6:
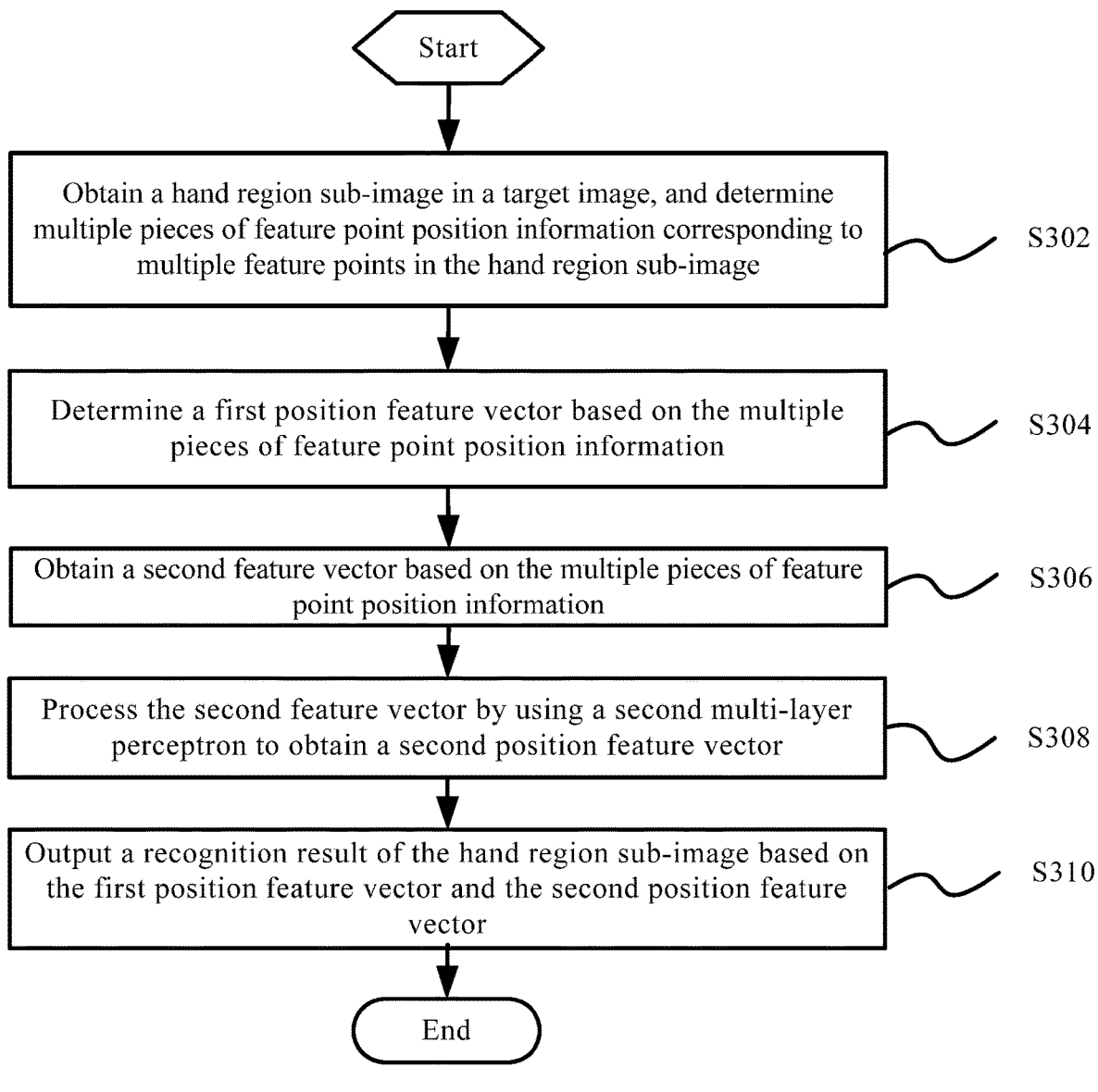
FIG. 6 is a third flowchart of a gesture recognition method according to an embodiment of this application.

FIG. 6 is a schematic flowchart of a gesture recognition method according to another embodiment of the first aspect of this application. The method includes the following steps:

Step S302: Obtain a sub-image of a hand region in a target image, and determine multiple pieces of feature point position information corresponding to multiple feature points in the sub-image of a hand region.

Step S304: Determine a first position feature vector based on the multiple pieces of feature point position information.

Step S306: Obtain a second feature vector based on the multiple pieces of feature point position information.

Step S308: Process the second feature vector by using a second multi-layer perceptron to obtain a second position feature vector.

Step S310: Output a recognition result of the sub-image of a hand region based on the first position feature vector and the second position feature vector.

In these embodiments, after position information of the multiple feature points is determined, the second feature vector is determined based on the position information of the multiple feature points, and an element in the second feature vector represents position information of each feature point in an X direction and a Y direction. The obtained second feature vector is processed by using the second multi-layer perceptron, so that a quantity of elements in the obtained second position feature vector is the same as a quantity of elements in the first position feature vector, thereby facilitating subsequent calculation.

Figure 7:
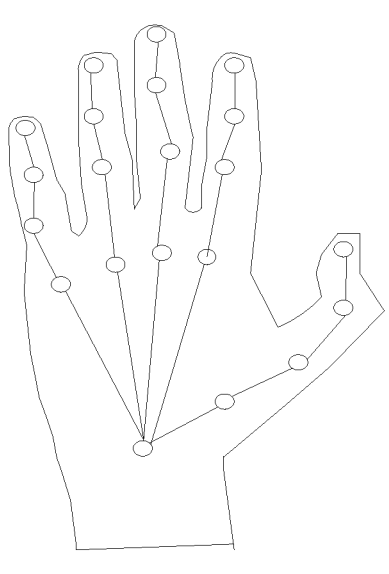
FIG. 7 is a schematic diagram of a feature point in a gesture recognition method according to an embodiment of this application.

For example, to preserve an absolute position relationship of the feature points in the sub-image of a hand region, it is necessary to process the feature point position information. As shown in FIG. 7, position information of 21 gesture feature points is obtained, a vector is defined first, and feature point position information of each feature point is filled into elements of the vector in sequence, and position information of each feature point occupies two element bits, representing coordinates of the feature point in the X direction and the Y direction respectively, and an obtained vector including 42 elements is used as the second feature vector: vector2=[position1-x, position1-y, positon2-x, position2-y . . . , position21-x, position21-y]. The obtained second feature vector is processed by using the second multi-layer perceptron to obtain a second position feature vector including 21 elements, that is, the second position feature vector of the feature points in the sub-image of a hand region. After processing of a third perceptual network structure, the quantity of elements in the second position feature vector is the same as the quantity of elements in the first position feature vector, so that the first position feature vector and the second position feature vector can be comprehensively analyzed in subsequent steps to obtain an action category of the sub-image of a hand region, and to further determine the recognition result.

FIG. 8 is a schematic flowchart of a gesture recognition method according to another embodiment of the first aspect of this application. The method includes the following steps:

Step S402: Obtain a sub-image of a hand region in a target image, and determine multiple pieces of feature point position information corresponding to multiple feature points in the sub-image of a hand region.

Step S404: Determine a first position feature vector based on the multiple pieces of feature point position information.

Step S406: Process the multiple pieces of feature point position information by using a first multi-layer perceptron to obtain a second position feature vector of the multiple feature points in the sub-image of a hand region.

Step S408: Add a vector value of the first position feature vector and a vector value of the second position feature vector in bits to obtain a fused vector value.

Step S410: Process the fused vector value by using a third multi-layer perceptron to obtain a classification vector.

Step S412: Determine an action category corresponding to a maximum value in the classification vector as a recognition result of the sub-image of a hand region.

In these embodiments, a specific method of determining the action category of the sub-image of a hand region based on the first position feature vector and the second position feature vector is proposed. After the first position feature vector and the second position feature vector are obtained, vector values of the first position feature vector and the second position feature vector are separately added in bits, that is, first position feature vector values and second position feature vector values of all feature points are added. The fused vector value obtained through adding is processed by using a fourth multi-layer mesh perception structure, to obtain the classification vector. Each element in the classification vector represents a probability that an action in the sub-image of a hand region conforms to an action category corresponding to the element. Therefore, an action category corresponding to an element with a largest maximum value in the classification vector is an action category that the action in the sub-image of a hand region most likely conforms to, and a recognition result of gesture recognition is determined.

Figure 9:
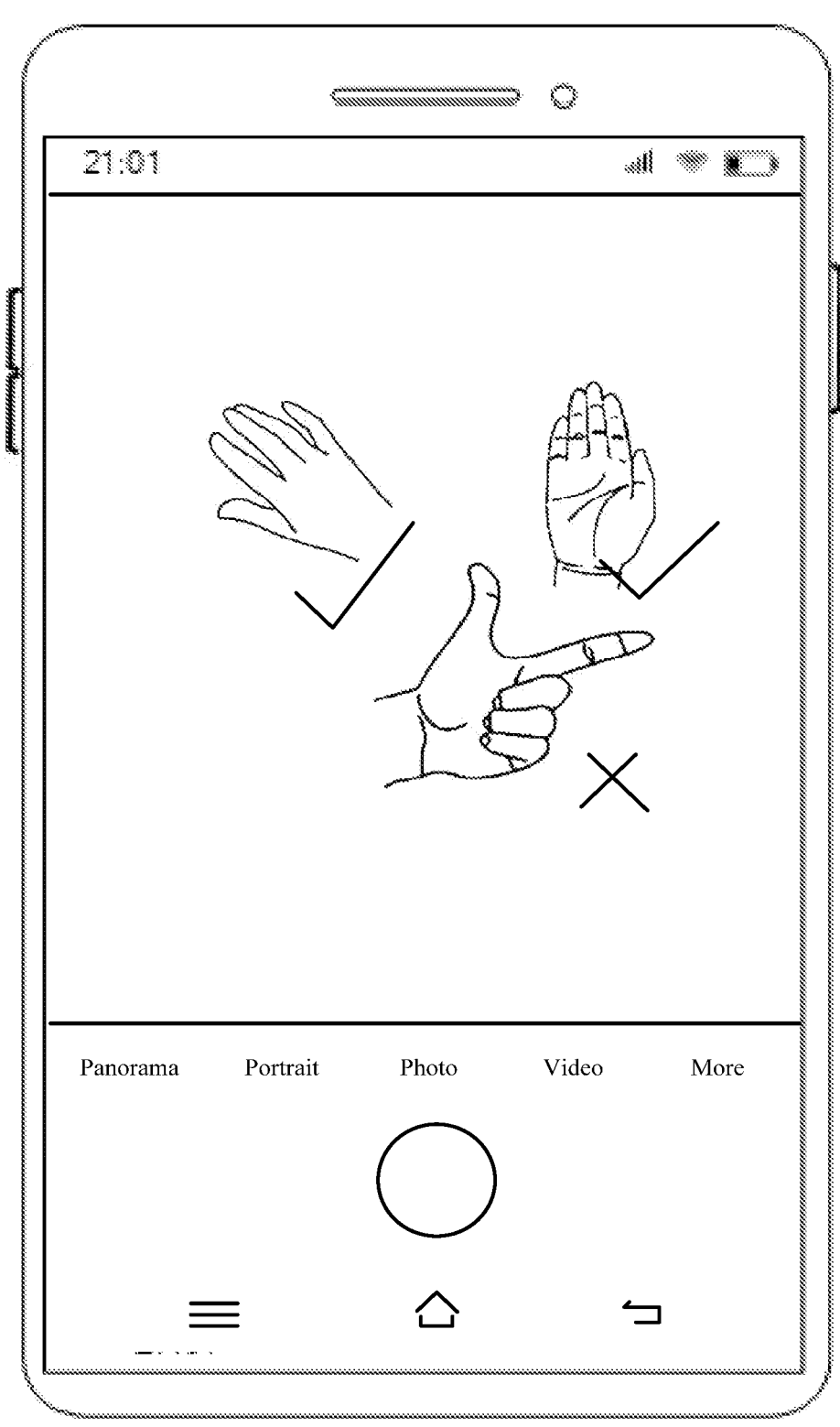
FIG. 9 is a schematic diagram of a recognition result of a gesture recognition method according to an embodiment of this application.

For example, the first position feature vector and the second position feature vector are vectors with a same quantity of elements, and are added in bits during fusion, and the obtained fused vector is processed by using a fourth multi-layer mesh perception structure to obtain a classification vector. Each element in the classification vector represents a probability that a gesture in the sub-image of a hand region belongs to an action category corresponding to the element. Therefore, an action corresponding to an element with a maximum value in the classification vector, that is, an action category corresponding to an element with a largest probability value, is selected as an action category corresponding to a gesture action in the sub-image of a hand region. Therefore, a gesture recognition result is output by using the foregoing steps. For example, FIG. 9 is a schematic diagram showing that a recognition result of recognizing a user gesture is "palm".

Figure 10:
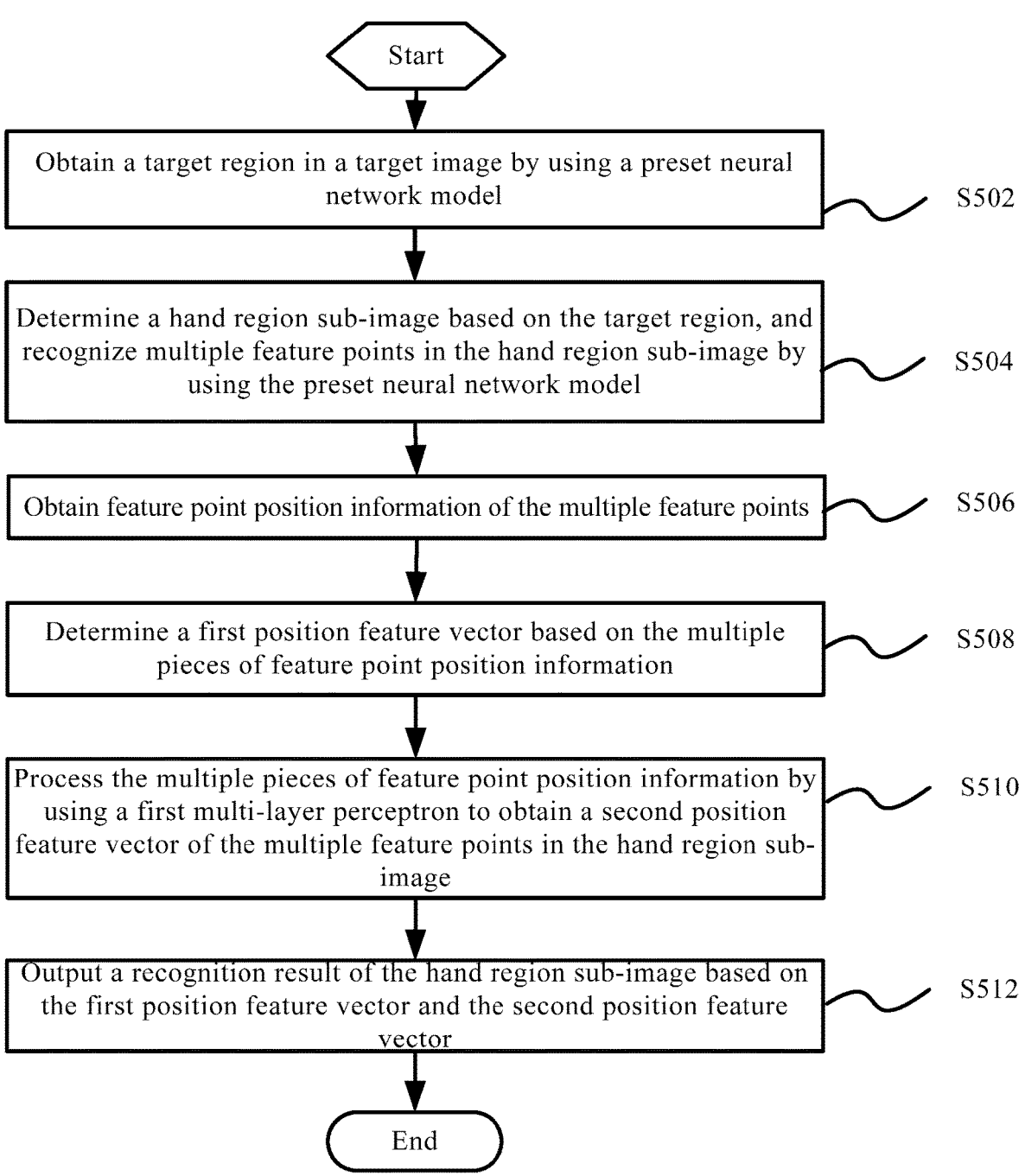
FIG. 10 is a fifth flowchart of a gesture recognition method according to an embodiment of this application.

FIG. 10 is a schematic flowchart of a gesture recognition method according to another embodiment of the first aspect of this application. The method includes the following steps:

Step S502: Obtain a target region in a target image by using a preset neural network model.

Step S504: Determine a sub-image of a hand region based on the target region, and recognize multiple feature points in the sub-image of a hand region by using the preset neural network model.

Step S506: Obtain feature point position information of the multiple feature points.

Step S508: Determine a first position feature vector based on the multiple pieces of feature point position information.

Step S510: Process the multiple pieces of feature point position information by using a first multi-layer perceptron to obtain a second position feature vector of the multiple feature points in the sub-image of a hand region.

Step S512: Output a recognition result of the sub-image of a hand region based on the first position feature vector and the second position feature vector.

In these embodiments, the target image is first processed by using the preset neural network model to obtain the target region in which the sub-image of a hand region is located, that is, the neural network model is used to find the sub-image of a hand region in a to-be-processed original image and determine a region range of the sub-image of a hand region. Then, the sub-image of a hand region is determined from the target region. The region range determined in the previous step is further narrowed to determine the sub-image of a hand region in which there are multiple feature points, and an action category can be accurately recognized by using the feature points. The multiple feature points in the sub-image of a hand region are recognized by using the preset neural network model, and the feature point position information of the multiple feature points is obtained, so that the recognition result of the sub-image of a hand region can be further determined based on the obtained feature point position information.

For example, the target image may be processed by a palm detection model in the preset neural network model to obtain the target region in which the sub-image of a hand region is located. The obtained target image is recognized by using the palm detection model, and the palm detection model can obtain, by using a matrix operation method in deep learning, vertex position information of a quadrangle of a region in which the sub-image of a hand region is located, and then can box-select a target region in which the sub-image of a hand region is located, that is, the hand region in this embodiment. Finally, the target image is clipped, and the box-selected target region in which the sub-image of a hand region is located is retained during clipping.

For example, the sub-image of a hand region is determined based on the target region by using a feature point detection model in the preset neural network model, the multiple feature points in the sub-image of a hand region are recognized by using the preset neural network model, and the multiple pieces of feature point position information are obtained. The feature point detection model detects the clipped target image to obtain the sub-image of a hand region, and the multiple feature points in the sub-image of a hand region and position information of the multiple feature points can be obtained by using a matrix operation in deep learning.

In some embodiments, after detecting the multiple pieces of feature point position information, the feature points may be smoothed and unshaken by using a conventional gesture recognition method (for example, a processing method such as Kalman filtering), so that the feature points are more sensitive and stable, and impact exerted on imaging quality of the target image by jotter in a shooting process is avoided, to prevent affect determining of positions of the multiple feature points.

Figure 11:
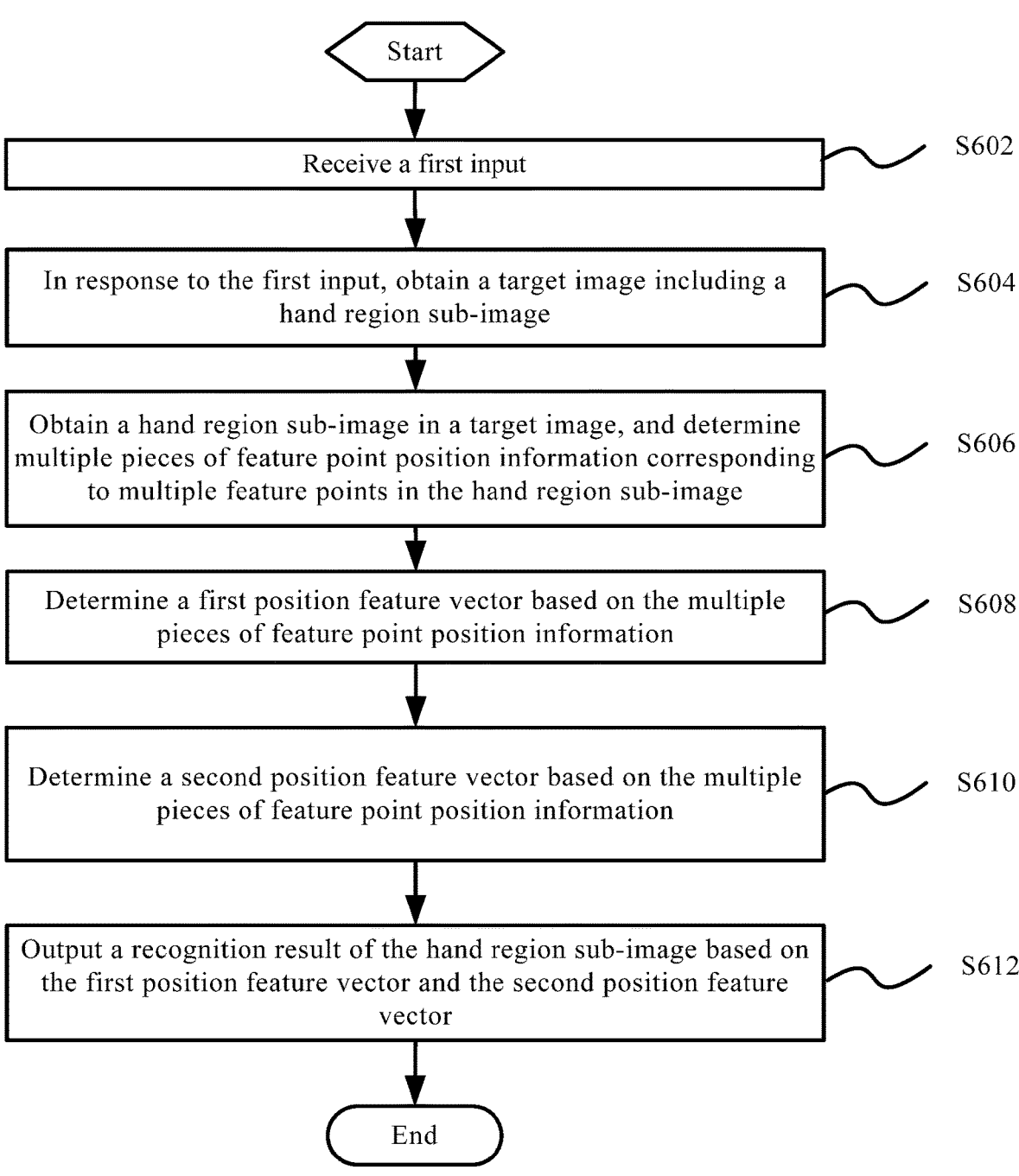
FIG. 11 is a sixth flowchart of a gesture recognition method according to an embodiment of this application.

FIG. 11 is a schematic flowchart of a gesture recognition method according to another embodiment of the first aspect of this application. The method includes the following steps:

Step S602: Receive a first input.

Step S604: In response to the first input, obtain a target image including a sub-image of a hand region.

Step S606: Obtain the sub-image of a hand region in the target image, and determine multiple pieces of feature point position information corresponding to multiple feature points in the sub-image of a hand region.

Step S608: Determine a first position feature vector based on the multiple pieces of feature point position information.

Step S610: Determine a second position feature vector based on the multiple pieces of feature point position information.

Step S612: Output a recognition result of the sub-image of a hand region based on the first position feature vector and the second position feature vector.

In these embodiments, the first input is received before the sub-image of a hand region in the target image is obtained, and the target image including the sub-image of a hand region is obtained in response to the first input. When the first input is not received, a to-be-processed image is not obtained, and subsequent operations are not performed, so that a huge calculation amount caused by frequent unnecessary gesture recognition is avoided, and a calculation load is reduced. In some embodiments, the first input may be a screen-side input or a voice input, and different input manners may adapt to multiple different use scenarios, to provide better experience for users.

Figure 12:
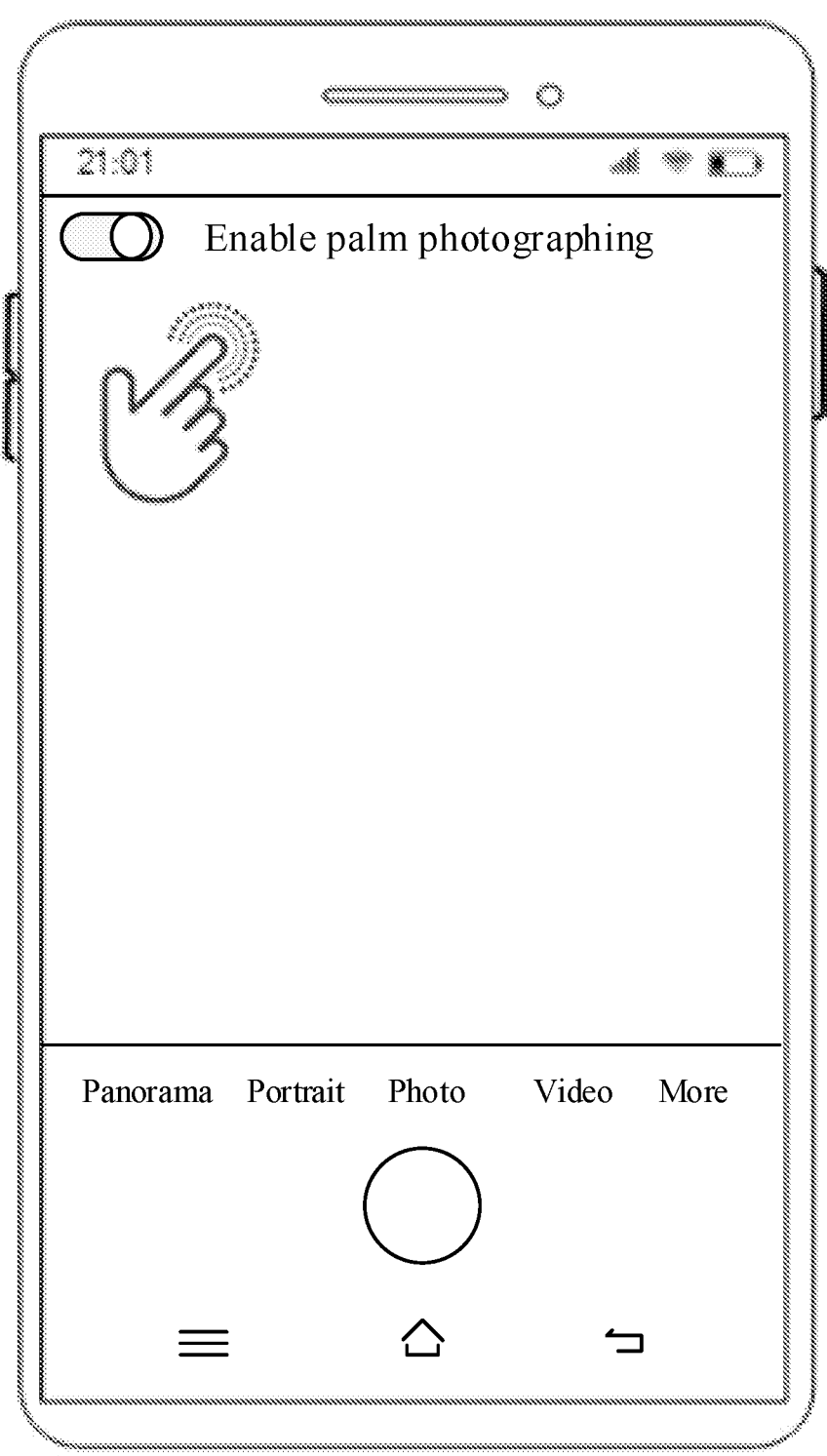
FIG. 12 is a schematic diagram of a sub-image of a hand region in a gesture recognition method according to an embodiment of this application.

For example, the received first input may be a screen-side input, and may be input by the user by tapping a touchscreen. FIG. 12 is a schematic diagram of photographing the "palm" to obtain a target image in the gesture recognition method according to this embodiment. As shown in FIG. 12, the user turns on camera preview and starts a photographing function. A tapping action of the user on a screen side is received, and this action is used as a first input. Then, a photographing preview function is started in response to the received first input. A gesture is made in a photographing preview function mode, and a hand enters a photographing range of a camera, so that a target image including the sub-image of a hand region can be obtained.

In some embodiments of this application, a method for recognizing a gesture when a hand is photographed at different viewing angles is provided. The method may include the following steps.

1. Obtain Feature Point Position Information.

First, the user enables camera preview, starts a palm photographing function, and receives and responds to a first input. Then, three deep learning neural network models are loaded to initialize a preset neural network model. For example, the preset neural network model includes a palm detection model, a feature point detection model, and a gesture classification model. The palm detection model can obtain a position of a palm region in a photo, the feature point detection model can obtain position information of a gesture feature point, and the gesture classification model can determine a type of a gesture action. The palm detection model is used to recognize an obtained target image, vertex position information of a quadrangle of a hand region can be obtained by using a matrix operation in deep learning, and then the hand region can be box-selected, that is, a target region in which a sub-image of a hand region is located is obtained. A relative position of the hand region in the user's picture is obtained, and the box-selected picture is clipped based on obtained gesture frame position information, the clipped picture is detected by using the feature point detection model, and position information of 21 feature points of the gesture by using the matrix operation in deep learning, so that multiple feature points in the sub-image of a hand region are obtained. A schematic diagram of the 21 feature points of the gesture is shown in FIG. 7. After 21 pieces of feature point position information are detected, the feature points are smoothed and unshaken by using a conventional gesture recognition method (for example, Kalman filtering), so that the feature points are more sensitive and stable. A stable artificial prior feature is then extracted to cope with a change in a viewing angle in an actual complex scenario.

2. Determine a Feature that a Viewing Angle Remains Unchanged.

In an actual scenario, a same gesture often has different shapes in pictures due to different viewing angles, and position coordinates of a gesture feature point are also different. As shown in FIG. 2 to FIG. 4, the gesture is "finger heart" that is commonly seen in short videos. FIG. 2 to FIG. 4 show changes of the gesture in various viewing angles. A heuristic manual feature in a related technology is usually a rule-based method. For example, for this gesture, key feature points are a first thumb feature point 202, a second thumb feature point 204, a third thumb feature point 206, and a fourth thumb feature point 208. To define the gesture, a mutual relationship between the foregoing feature points needs to be considered, and stability of the mutual relationship in changes of various viewing angles such as rotation further needs to be considered. A 21*21 upper triangular matrix is calculated by using the position information of the 21 feature points of the gesture that is obtained in the previous step, where an element in each matrix represents a Euclidean distance between points; a feature vector corresponding to a maximum feature value is extracted for the matrix to obtain a first feature vector including 21 elements; and a feature is further extracted for the first feature vector by using a multi-layer perceptron to obtain a first position feature vector of a relative position relationship between feature points, that is, a viewing angle invariant feature vector.

3. Determine an Automatic Learning Feature.

A viewing angle invariant feature feature1 preserves the relative position relationship between the feature points. To preserve an absolute position relationship of the feature points in the picture, original feature point information needs to pass through a supervised multi-layer perceptron to obtain an automatic learning feature feature2. In some embodiments, a second feature vector needs to be defined, the second feature vector includes 42 elements that separately represent coordinates of each feature point in x and y directions. Then, the feature point information passes through three layers of multi-layer perceptrons to obtain an automatic learning feature vector including 21 elements, that is, a second position feature vector of the feature points in the sub-image of a hand region.

4. Determine a Gesture Category.

The first position feature vector, that is, the viewing angle invariant feature vector, and the second position feature vector, that is, the automatic learning feature vector, are fused, and a classification result is output. For example, the first position feature vector and the second position feature vector are vectors with a same dimension, and are added in bits during fusion. After an obtained fused vector passes through two layers of multi-layer perceptrons, a final classification vector result is obtained, which represents a probability of belonging to each gesture category, and a category with a largest probability is a corresponding gesture. Therefore, the gesture category is output by using the foregoing steps. Then, the action category of the gesture of the user is "palm", and an intention of the user is captured. Assuming that a meaning of the extracted "palm" is "photographing", it indicates that the user makes the gesture to implement a photographing function. Finally, the photographing function is triggered, and the user's photo is saved.

Figure 13:
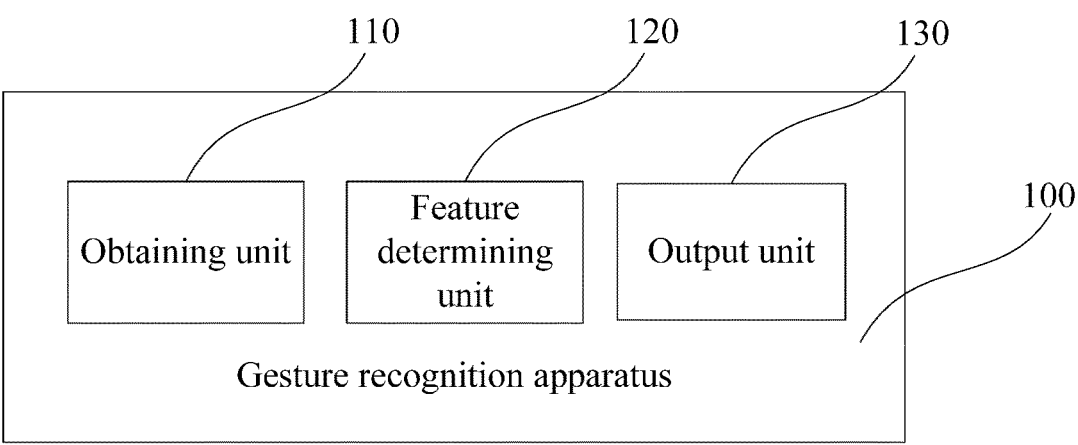
FIG. 13 is a first schematic block diagram of a structure of a gesture recognition apparatus according to an embodiment of this application.

As shown in FIG. 13, an embodiment of a second aspect of this application provides a gesture recognition apparatus 100, including: an obtaining unit 110, configured to: obtain a sub-image of a hand region in a target image, and determine multiple pieces of feature point position information corresponding to multiple feature points in the sub-image of a hand region; a feature determining unit 120, configured to determine a first position feature vector of a relative position relationship of the multiple feature points based on the multiple pieces of feature point position information, and process the multiple pieces of feature point position information by using a first multi-layer perceptron to obtain a second position feature vector of the multiple feature points in the sub-image of a hand region; and an output unit 130, configured to output a recognition result of the sub-image of a hand region based on the first position feature vector and the second position feature vector.

For example, in this embodiment, the obtaining unit 110 functions to obtain the sub-image of a hand region and to determine the multiple pieces of feature point position information in the sub-image of a hand region, the feature determining unit 120 functions to determine the first position feature vector and the second position feature vector, that is, to determine relative positions of feature points and an absolute position of the feature point in the image, and the output unit 130 performs corresponding operation processing based on the first position feature vector and the second position feature vector that are determined by the feature determining unit 120, and determines and outputs the recognition result of the sub-image of a hand region. This gesture recognition apparatus takes a mutual relationship between multiple feature points into consideration, so that a problem of misrecognition in various cases of viewing angle changes is effectively resolved, and stability of action recognition is improved.

Figure 14:
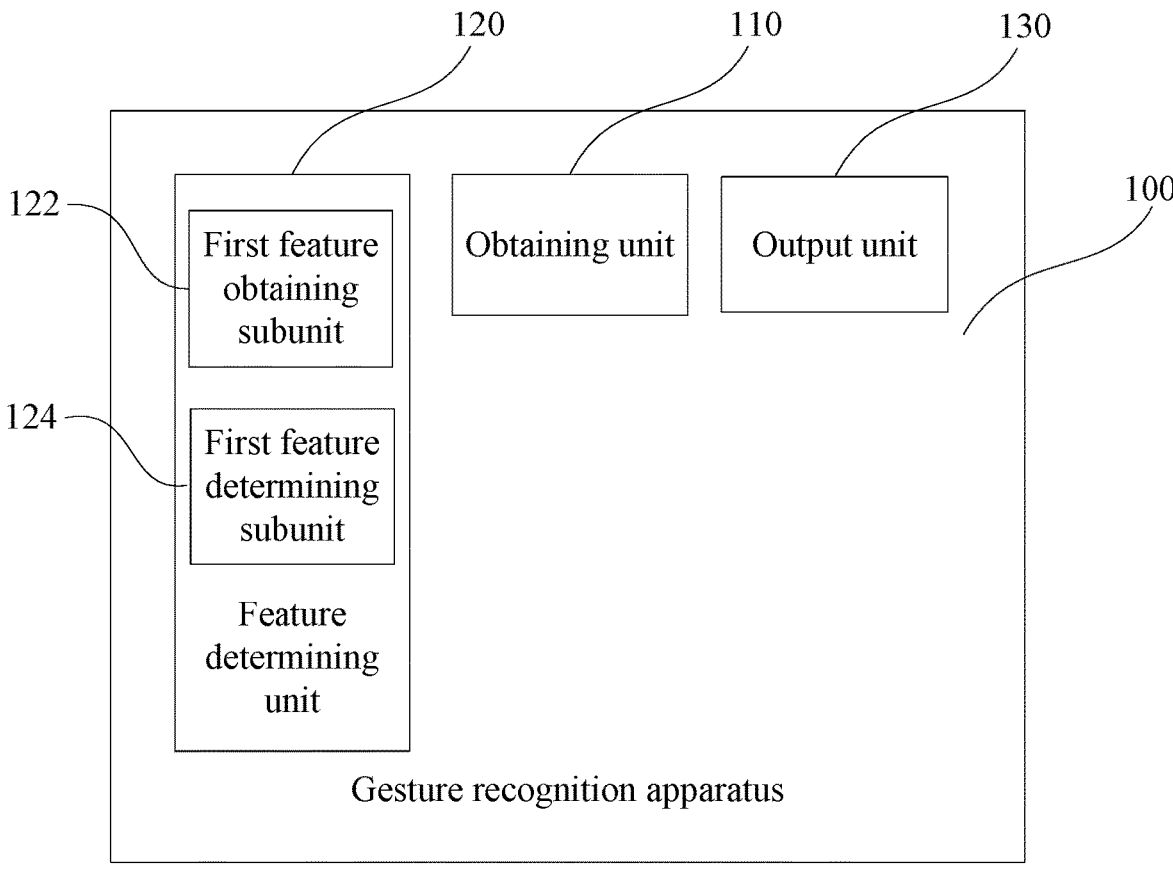
FIG. 14 is a second schematic block diagram of a structure of a gesture recognition apparatus according to an embodiment of this application.

In some embodiments, as shown in FIG. 14, the feature determining unit 120 includes: a first feature obtaining subunit 122, configured to: establish a first coordinate matrix based on the multiple pieces of feature point position information, and obtain a first feature vector corresponding to a maximum feature value of the first coordinate matrix; and a first feature determining subunit 124, configured to process the first feature vector by using the first multi-layer perceptron to obtain the first position feature vector.

In these embodiments, after position information of the multiple feature points is determined, the first feature obtaining subunit 122 establishes the first coordinate matrix based on the position information of the multiple feature points, and obtains the first feature vector corresponding to the maximum feature value of the first coordinate matrix through calculation. The first feature vector is introduced to select a good set of bases for subsequent operations. The first feature determining subunit 124 processes the obtained first feature vector by using the first multi-layer perceptron, and rules out impact exerted by a viewing angle on determining of an action category, so that the action category can be accurately recognized at different viewing angles.

In some embodiments, an element in the first coordinate matrix is a Euclidean distance between any two of the multiple feature points.

In these embodiments, the Euclidean distance between the feature points is used as the element in the first coordinate matrix, and the Euclidean distance can represent a real distance between two points in multi-dimensional space. Therefore, the Euclidean distance, rather than a planar distance between the feature points in a direction perpendicular to a photographing device, is used in these embodiments, so that a problem of determining a distance between any two feature points in different viewing angles can be effectively resolved.

In some embodiments, the first coordinate matrix is an upper triangular matrix.

For example, an element in the first coordinate matrix is a relative distance between a feature point corresponding to a row in which the first coordinate matrix is located and a feature point corresponding to a column in which the first coordinate matrix is located. For example, an element in a third column and a second row of the matrix may represent a relative distance between a second feature point and a third feature point, and an element in a second column and a third row of the matrix may represent a relative distance between the third feature point and the second feature point. It can be learned that values of the two elements are repeated, and a large quantity of repeated elements increases operation complexity. Therefore, in these embodiments, the established first coordinate matrix is a multi-dimensional upper triangular matrix, elements at the bottom left of a diagonal of the first coordinate matrix are all 0, and elements at the top right of the diagonal are the relative distance between the feature point corresponding to the row in which the first coordinate matrix is located and the feature point corresponding to the column in which the first coordinate matrix is located, thereby simplifying an operation process.

Figure 15:
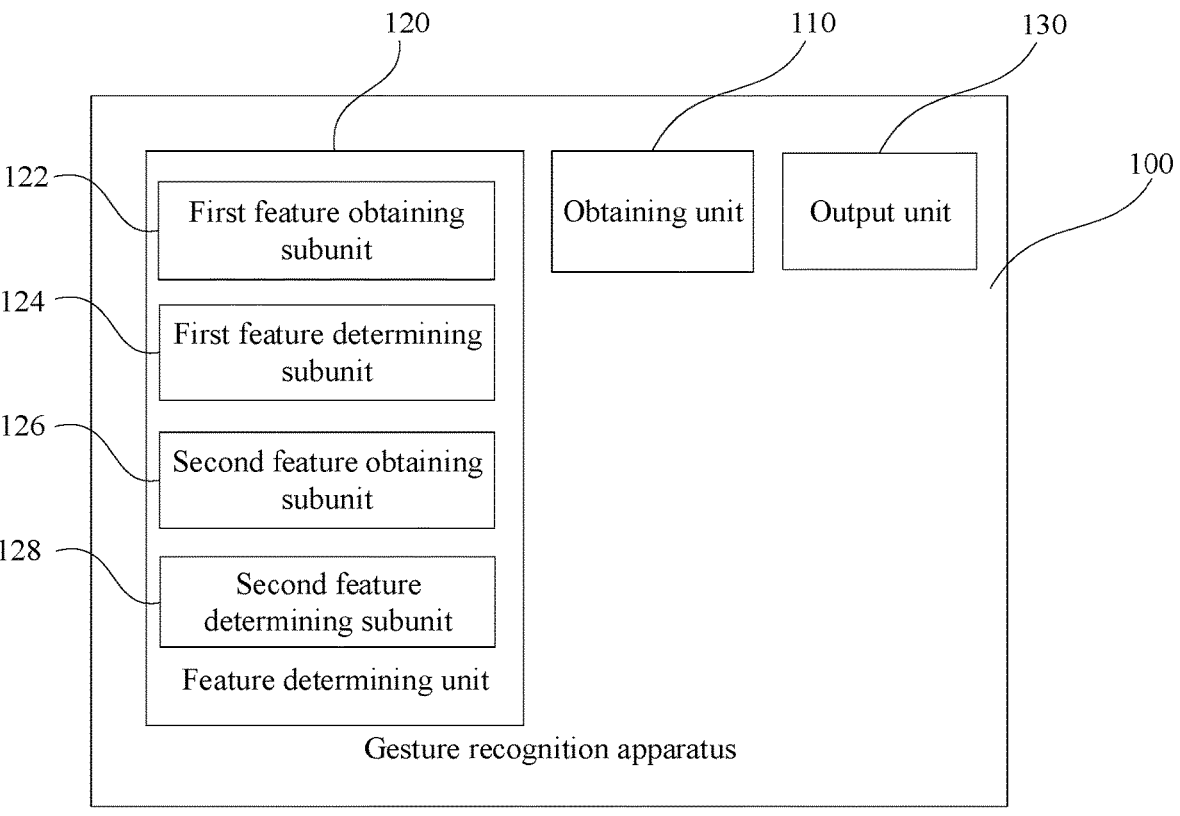
FIG. 15 is a third schematic block diagram of a structure of a gesture recognition apparatus according to an embodiment of this application.

In some embodiments, as shown in FIG. 15, the feature determining unit 120 further includes: a second feature obtaining subunit 126, configured to obtain a second feature vector based on the multiple pieces of feature point position information; and a second feature determining subunit 128, configured to process the second feature vector by using a second multi-layer perceptron to obtain the second position feature vector.

In these embodiments, after determining the position information of the multiple feature points, the second feature obtaining subunit 126 determines the second feature vector based on the position information of the multiple feature points, where an element in the second feature vector represent positions of each feature point in x and y directions separately. The second feature determining subunit 128 processes the obtained second feature vector by using the second multi-layer perceptron, so that a quantity of elements in the obtained second position feature vector is the same as a quantity of elements in the first position feature vector, thereby facilitating subsequent calculation.

Figure 16:
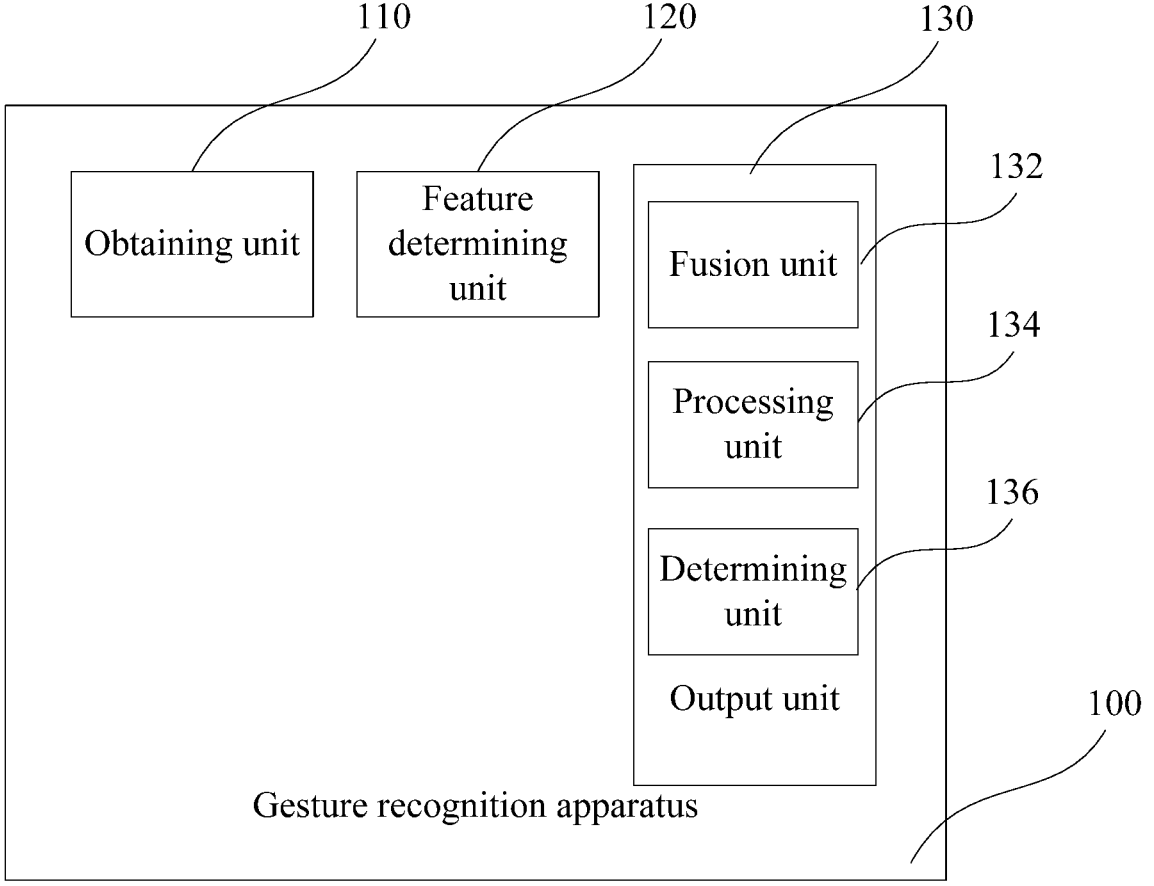
FIG. 16 is a fourth schematic block diagram of a structure of a gesture recognition apparatus according to an embodiment of this application.

In some embodiments, as shown in FIG. 16, the output unit 130 further includes: a fusion unit 132, configured to add a vector value of the first position feature vector and a vector value of the second position feature vector in bits to obtain a fused vector value; a processing unit 134, configured to process the fused vector value by using a third multi-layer perceptron to obtain a classification vector; a determining unit 136, configured to determine an action category corresponding to a maximum value in the classification vector as the recognition result of the sub-image of a hand region.

In these embodiments, a unit structure of the output unit 130 for determining the recognition result of the sub-image of a hand region based on the first position feature vector and the second position feature vector is proposed. After obtaining the first position feature vector and the second position feature vector, the fusion unit 132 adds the vector values of the first position feature vector and the second position feature vector in bits, that is, adds a first position feature vector value and a second position feature vector value of each feature point. The processing unit 134 processes, by using a fourth multi-layer mesh perception structure, a value of the fused vector obtained through adding, to obtain the classification vector. Each element in the classification vector represents a probability that an action in the sub-image of a hand region conforms to an action category corresponding to the element. Therefore, the determining unit 136 selects an action category corresponding to a maximum value in the classification vector as an action category that the action in the sub-image of a hand region most likely conforms to.

Figure 17:
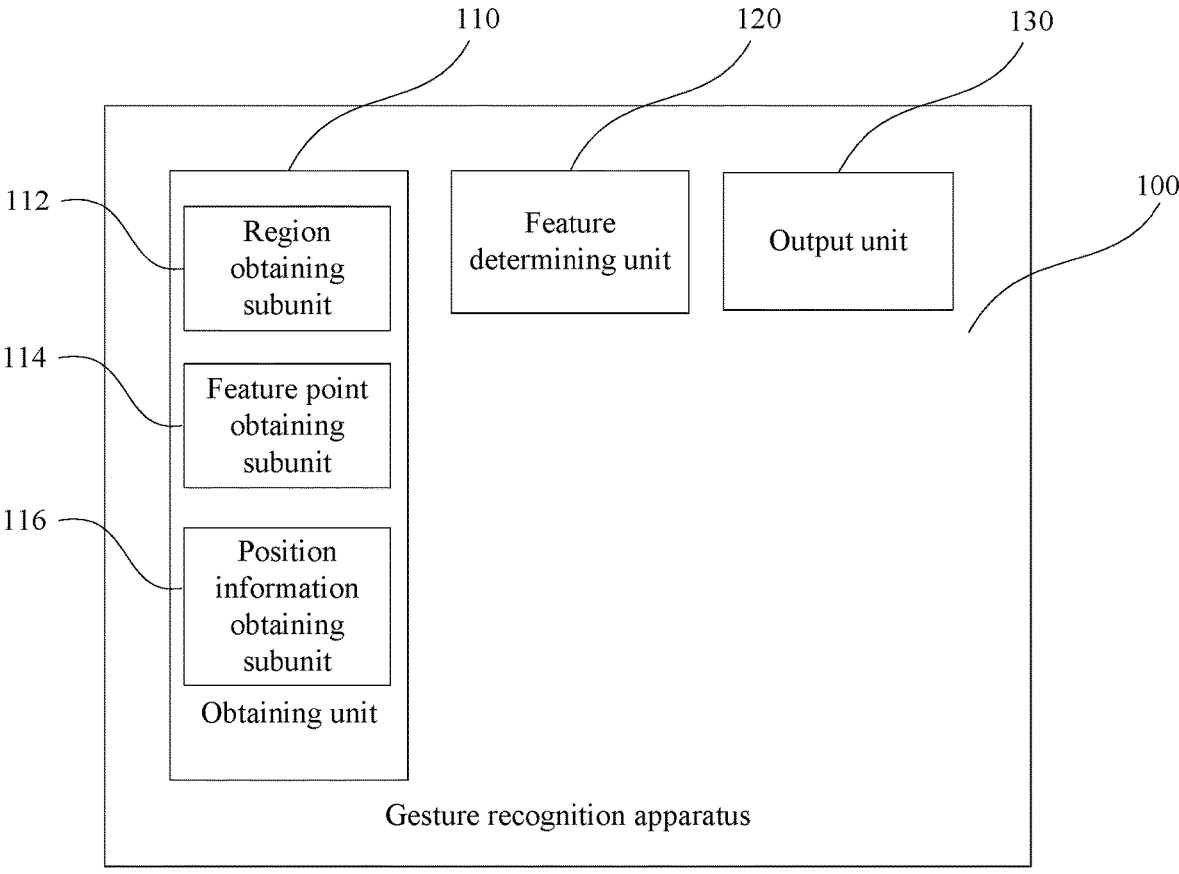
FIG. 17 is a fifth schematic block diagram of a structure of a gesture recognition apparatus according to an embodiment of this application.

In some embodiments, as shown in FIG. 17, the obtaining unit 110 further includes: a region obtaining subunit 112, configured to process a target image by using a preset neural network model to obtain a target region in which the sub-image of a hand region is located; a feature point obtaining subunit 114, configured to: determine the sub-image of a hand region based on the target region, and recognize multiple feature points in the sub-image of a hand region by using the preset neural network model; and a position information obtaining subunit 116, configured to obtain feature point position information of the multiple feature points.

In these embodiments, first, the region obtaining subunit 112 processes the target image by using the preset neural network model to obtain the target region in which the sub-image of a hand region is located, that is, finds the sub-image of a hand region in an original to-be-processed image by using the neural network model, and determines a region range of the sub-image of a hand region. Then, the feature point obtaining subunit 114 determines the sub-image of a hand region from the target region. The region range determined in the previous step is further narrowed to determine the sub-image of a hand region in which there are multiple feature points, and an action category can be accurately recognized by using the feature points. The feature point obtaining subunit 114 recognizes the multiple feature points in the sub-image of a hand region by using the preset neural network model, and the position information obtaining subunit 116 obtains the feature point position information of the multiple feature points, so that the recognition result of the image can be further determined based on the obtained feature point position information.

Figure 18:
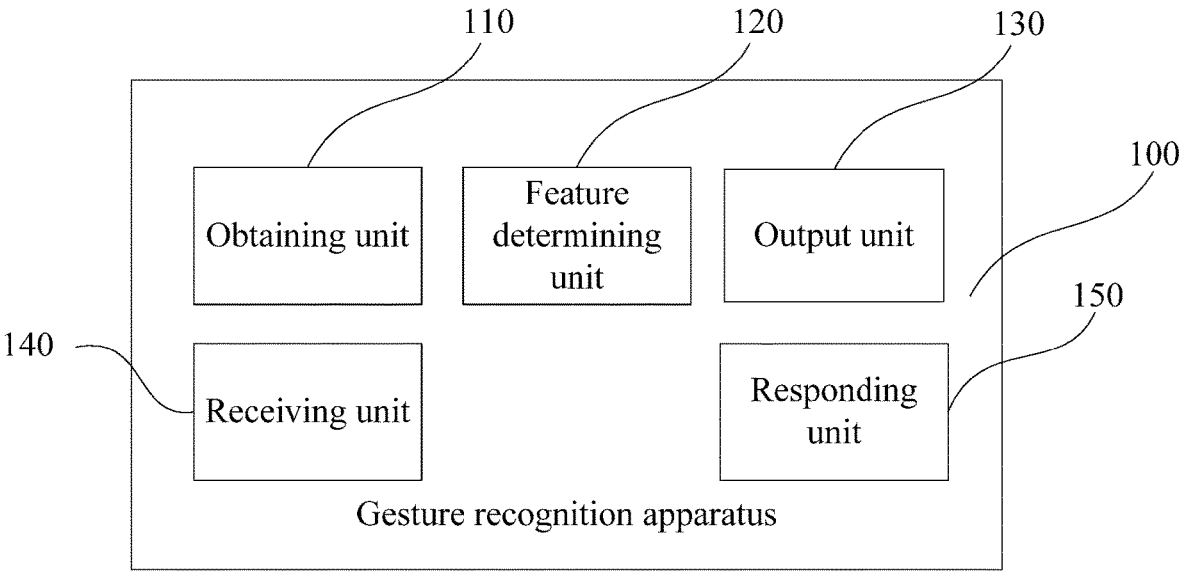
FIG. 18 is a sixth schematic block diagram of a structure of a gesture recognition apparatus according to an embodiment of this application.

In some embodiments, as shown in FIG. 18, the gesture recognition apparatus 100 further includes: a receiving unit 140, configured to receive a first input; and a responding unit 150, configured to: in response to the first input, obtain the target image including the sub-image of a hand region.

In these embodiments, before the sub-image of a hand region in the target image is obtained, the receiving unit 140 first receives the first input, and the responding unit 150 obtains, in response to the first input, the target image including the sub-image of a hand region. When the receiving unit 140 does not receive the first input, the gesture recognition apparatus 100 does not obtain the to-be-processed image or perform a subsequent operation, thereby avoiding a large calculation amount caused by frequent unnecessary gesture recognition, and reducing a calculation load. In some embodiments, the first input may be a screen-side input or a voice input, and different input manners may adapt to multiple different use scenarios, to provide better experience for users.

Figure 19:
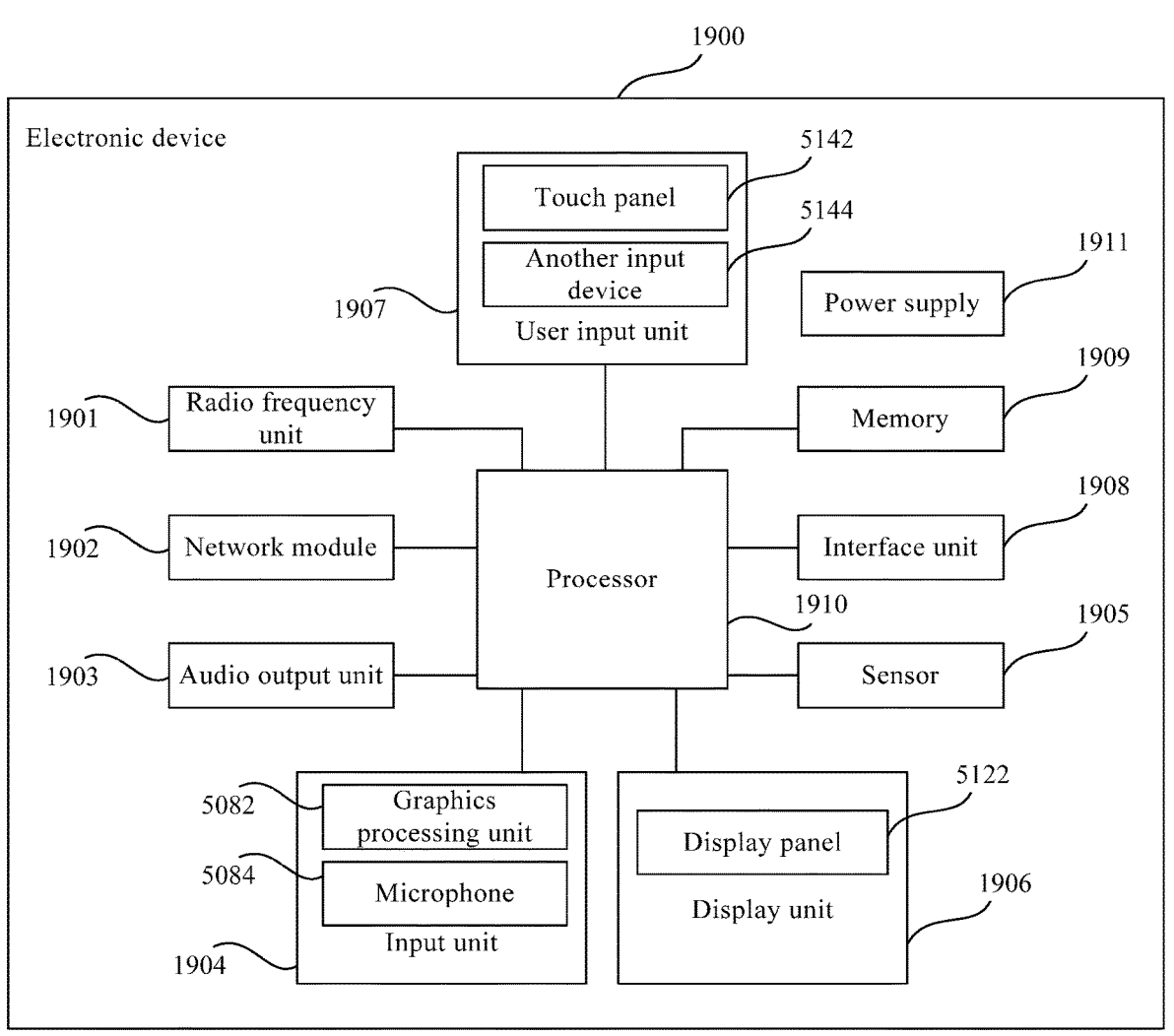
FIG. 19 is a schematic diagram of a hardware structure of an electronic device according to an embodiment of this application.

FIG. 19 is a schematic diagram of a hardware structure of an electronic device according to an embodiment of this application.

An electronic device 1900 provided in this embodiment of this application may be, for example, a mobile phone, a notebook computer, or a tablet computer.

The electronic device 1900 includes but is not limited to components such as a radio frequency unit 1901, a network module 1902, an audio output unit 1903, an input unit 1904, a sensor 1905, a display unit 1906, a user input unit 1904, an interface unit 1908, a memory 1909, and a processor 1910.

A person skilled in the art can understand that the electronic device 1900 may further include a power supply 1911 (such as a battery) that supplies power to each component. The power supply may be logically connected to the processor 1910 by using a power supply management system, to implement functions such as charging and discharging management, and power consumption management by using the power supply management system. A structure of the electronic device shown in FIG. 19 does not constitute a limitation on the electronic device, and may include more or fewer components than those shown in the figure, or combine some components, or have different part arrangements. Details are not described herein again.

The processor 1910 is configured to: determine multiple pieces of feature point position information corresponding to multiple feature points in a sub-image of a hand region; determine a first position feature vector of a relative position relationship of the multiple feature points based on the multiple pieces of feature point position information; process the multiple pieces of feature point position information by using a first multi-layer perceptron to obtain a second position feature vector of the multiple feature points in the sub-image of a hand region; and output a recognition result of the sub-image of a hand region based on the first position feature vector and the second position feature vector.

It should be understood that, in this embodiment of this application, the radio frequency unit 1901 may be configured to receive and send information or a signal in a call process. In some embodiments, the radio frequency unit 1901 receives downlink data of a base station or sends uplink data to a base station. The radio frequency unit 1901 includes but is not limited to an antenna, at least one amplifier, a transceiver, a coupler, a low noise amplifier, a duplexer, and the like.

The network module 1902 provides wireless broadband Internet access for a user, for example, helping the user send and receive an e-mail, browse a web page, and access streaming media.

The audio output unit 1903 may convert audio data received by the radio frequency unit 1901 or the network module 1902 or stored in the memory 1909 into an audio signal and output the audio signal as sound. In addition, the audio output unit 1903 may further provide an audio output related to a specific function performed by the electronic device 1900 (for example, call signal receiving sound and message receiving sound). The audio output unit 1903 includes a speaker, a buzzer, a telephone receiver, and the like.

The input unit 1904 is configured to receive an audio signal or a video signal. The input unit 1904 may include a Graphics Processing Unit (GPU) 5082 and a microphone 5084. The graphics processing unit 5082 processes image data of a static image or a video obtained by an image capturing apparatus (for example, a camera) in a video capturing mode or an image capturing mode. A processed image frame may be displayed on the display unit 1906, or stored in the memory 1909 (or another storage medium), or sent by using the radio frequency unit 1901 or the network module 1902. The microphone 5084 may receive a sound, and can process the sound into audio data. Processed audio data may be converted, in a call mode, into a format that can be sent to a mobile communication base station by using the radio frequency unit 1901 for output.

The electronic device 1900 further includes at least one sensor 1905, such as a fingerprint sensor, a pressure sensor, an iris sensor, a molecular sensor, a gyroscope, a barometer, a hygrometer, a thermometer, an infrared sensor, an optical sensor, a motion sensor, and another sensor.

The display unit 1906 is configured to display information entered by the user or information provided for the user. The display unit 1906 may include a display panel 5122. In some embodiments, the display panel 5122 may be configured in a form such as a liquid crystal display or an organic light-emitting diode.

The user input unit 1907 may be configured to: receive entered digital or character information, and generate a key signal input related to user setting and function control of the electronic device. For example, the user input unit 1907 includes a touch panel 5142 and another input device 5144. The touch panel 5142 is also referred to as a touchscreen, and may collect a touch operation performed by the user on or near the touch panel 5142. The touch panel 5142 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 1910, and receives and executes a command sent by the processor 1910. The another input device 5144 may include but is not limited to a physical keyboard, a functional button (such as a volume control button or a power on/off button), a trackball, a mouse, and a joystick. Details are not described herein.

Further, the touch panel 5142 may cover the display panel 5122. When detecting the touch operation on or near the touch panel 5142, the touch panel 5142 transmits the touch operation to the processor 1910 to determine a type of a touch event, and then the processor 1910 provides a corresponding visual output on the display panel 5122 based on the type of the touch event. The touch panel 5142 and the display panel 5122 may be used as two independent components, or may be integrated into one component.

The interface unit 1908 is an interface for connecting an external apparatus to the electronic device 1900. For example, the external apparatus may include a wired or wireless headset jack, an external power supply (or a battery charger) port, a wired or wireless data port, a storage card port, a port for connecting an apparatus with an identification module, an audio input/output (I/O) port, a video I/O port, and a headset jack. The interface unit 1908 may be configured to receive an input (for example, data information and power) from an external apparatus and transmit the received input to one or more elements in the electronic device 1900, or may be configured to transmit data between the electronic device 1900 and the external apparatus.

The memory 1909 may be configured to store a software program and various pieces of data. The memory 1909 may mainly include a program storage region and a data storage region. The program storage region may store an operating system, an application required by at least one function (such as a sound playing function or an image playing function), and the like. The data storage region may store data (such as audio data or a phone book) created according to use of a mobile terminal, and the like. In addition, the memory 1909 may include a high-speed random access memory, and may further include a nonvolatile memory, for example, at least one magnetic disk storage device, a flash storage device, or another volatile solid-state storage device.

The processor 1910 is configured to implement various functions of the electronic device 1900 and data processing by running or executing a software program and/or a module stored in the memory 1909 and by invoking data stored in the memory 1909, to perform overall monitoring on the electronic device 1900. The processor 1910 may include one or more processing units. In some embodiments, an application processor and a modem processor may be integrated into the processor 1910. The application processor mainly processes an operating system, a user interface, an application program, and the like. The modem processor mainly processes wireless communications.

The electronic device 1900 may further include the power supply 1911 supplying power to each component. In some embodiments, the power supply 1911 may be logically connected to the processor 1910 by using a power management system, to implement functions such as charging management, discharging management, and power consumption management by using the power management system.

An embodiment of this application further provides a readable storage medium. The readable storage medium stores a program or an instruction, and when the program or the instruction is executed by a processor, the processes of the foregoing gesture recognition method embodiment are implemented and a same technical effect can be achieved. To avoid repetition, details are not described herein again.

The processor is a processor in the electronic device in the foregoing embodiment. The readable storage medium includes a computer-readable storage medium, and examples of computer-readable storage media include non-transient computer-readable storage media, such as a computer Read-Only Memory (ROM), a Random Access Memory (RAM), a magnetic disk, or an optical disk.

An embodiment of this application further provides a chip including a processor and a communication interface. The communication interface is coupled to the processor, and the processor is configured to run a program or an instruction to implement the steps of the gesture recognition method in the first aspect, so that all beneficial effects of the gesture recognition method are provided, and details are not described herein.

It should be understood that the chip mentioned in this embodiment of this application may also be referred to as a system-level chip, a system chip, a chip system, or a system on a chip.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes multiple instructions for instructing a terminal (which may be a mobile phone, a computer, a server, an air conditioner, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application. In the descriptions of this specification, descriptions with reference to terms such as "an embodiment", "some embodiments", or "a schematic embodiment" means that specific features, structures, materials, or characteristics described in combination with the embodiments or examples are included in at least one embodiment or example of this application. In this specification, the schematic descriptions of the foregoing terms do not necessarily refer to the same embodiment or example. Moreover, the described specific features, structures, materials, or characteristics may be combined in a proper way in any one or more embodiments or examples.

The foregoing are merely exemplary embodiments of this application, and are not intended to limit this application. Various modifications and variations are possible for those skilled in the art. Any modifications, equivalent replacements, improvements, and the like made without departing from the spirit and principle of this application shall fall within the scope of this application.

The invention claimed is:

1. A gesture recognition method, comprising:
   obtaining a sub-image of a hand region in a target image, and determining multiple pieces of feature point position information corresponding to multiple feature points in the sub-image of the hand region;
   determining a first position feature vector based on the multiple pieces of feature point position information, wherein the first position feature vector represents a relative position relationship of any one of the multiple feature points relative to remaining feature points in the multiple feature points;
   determining a second position feature vector based on the multiple pieces of feature point position information, wherein the second position feature vector represents an absolute position relationship of the multiple feature points in the sub-image of the hand region; and
   outputting a recognition result of the sub-image of the hand region based on the first position feature vector and the second position feature vector,
   wherein determining the first position feature vector based on the multiple pieces of feature point position information comprises:
      obtaining a first feature vector in a first coordinate matrix established based on the multiple pieces of feature point position information; and
      processing the first feature vector by using a first multi-layer perceptron to obtain the first position feature vector.

2. The gesture recognition method according to claim 1, wherein
   the first feature vector corresponds to a maximum feature value of the first coordinate matrix.

3. The gesture recognition method according to claim 2, wherein an element in the first coordinate matrix is a Euclidean distance between any one of the multiple feature points and any one of remaining feature points in the multiple feature points.

4. The gesture recognition method according to claim 2, wherein the first coordinate matrix is an upper triangular matrix.

5. The gesture recognition method according to claim 1, wherein determining the second position feature vector based on the multiple pieces of feature point position information comprises:
   obtaining a second feature vector based on the multiple pieces of feature point position information; and
   processing the second feature vector by using a second multi-layer perceptron to obtain the second position feature vector.

6. The gesture recognition method according to claim 1, wherein outputting the recognition result of the sub-image of the hand region based on the first position feature vector and the second position feature vector comprises:
   adding a vector value of the first position feature vector and a vector value of the second position feature vector in bits to obtain a fused vector value;
   processing the fused vector value by using a third multi-layer perceptron to obtain a classification vector; and
   determining an action category corresponding to a maximum value in the classification vector as the recognition result of the sub-image of the hand region.

7. The gesture recognition method according to claim 1, wherein obtaining the sub-image of the hand region in the target image, and determining the feature point position information corresponding to the feature point in the sub-image of the hand region comprises:
   obtaining a target region in the target image by using a preset neural network model;
   determining the sub-image of the hand region based on the target region, and recognizing multiple feature points in the sub-image of the hand region by using the preset neural network model; and
   obtaining feature point position information of the multiple feature points.

8. The gesture recognition method according to claim 1, further comprising, before obtaining the sub-image of the hand region in the target image:
   receiving a first input; and
   in response to the first input, obtaining the target image comprising the sub-image of the hand region.

9. An electronic device, comprising:

a memory storing a computer program; and a processor coupled to the memory and configured to execute the computer program, wherein the computer program, when executed by the processor, causes the processor to perform operations comprising:

obtaining a sub-image of a hand region in a target image, and determining multiple pieces of feature point position information corresponding to multiple feature points in the sub-image of the hand region;

determining a first position feature vector based on the multiple pieces of feature point position information, wherein the first position feature vector represents a relative position relationship of any one of the multiple feature points relative to remaining feature points in the multiple feature points;

determining a second position feature vector based on the multiple pieces of feature point position information, wherein the second position feature vector represents an absolute position relationship of the multiple feature points in the sub-image of the hand region; and outputting a recognition result of the sub-image of the hand region based on the first position feature vector and the second position feature vector, wherein determining the first position feature vector based on the multiple pieces of feature point position information comprises:

obtaining a first feature vector in a first coordinate matrix established based on the multiple pieces of feature point position information; and processing the first feature vector by using a first multi-layer perceptron to obtain the first position feature vector.

10. The electronic device according to claim 9, wherein the first feature vector corresponds to a maximum feature value of the first coordinate matrix.

11. The electronic device according to claim 10, wherein an element in the first coordinate matrix is a Euclidean distance between any one of the multiple feature points and any one of remaining feature points in the multiple feature points.

12. The electronic device according to claim 10, wherein the first coordinate matrix is an upper triangular matrix.

13. The electronic device according to claim 9, wherein determining the second position feature vector based on the multiple pieces of feature point position information comprises:

obtaining a second feature vector based on the multiple pieces of feature point position information; and processing the second feature vector by using a second multi-layer perceptron to obtain the second position feature vector.

14. The electronic device according to claim 9, wherein outputting the recognition result of the sub-image of the hand region based on the first position feature vector and the second position feature vector comprises:

adding a vector value of the first position feature vector and a vector value of the second position feature vector in bits to obtain a fused vector value;

processing the fused vector value by using a third multi-layer perceptron to obtain a classification vector; and determining an action category corresponding to a maximum value in the classification vector as the recognition result of the sub-image of the hand region.

15. The electronic device according to claim 9, wherein obtaining the sub-image of the hand region in the target image, and determining the feature point position information corresponding to the feature point in the sub-image of the hand region comprises:

obtaining a target region in the target image by using a preset neural network model;

determining the sub-image of the hand region based on the target region, and recognizing multiple feature points in the sub-image of the hand region by using the preset neural network model; and obtaining feature point position information of the multiple feature points.

16. The electronic device according to claim 9, before obtaining the sub-image of the hand region in the target image, the operations further comprising:

receiving a first input; and in response to the first input, obtaining the target image comprising the sub-image of the hand region.

17. A non-transitory computer-readable storage medium, storing a computer program, when the computer program is executed by a processor, causes the processor to perform operations comprising:

obtaining a sub-image of a hand region in a target image, and determining multiple pieces of feature point position information corresponding to multiple feature points in the sub-image of the hand region;

determining a first position feature vector based on the multiple pieces of feature point position information, wherein the first position feature vector represents a relative position relationship of any one of the multiple feature points relative to remaining feature points in the multiple feature points;

determining a second position feature vector based on the multiple pieces of feature point position information, wherein the second position feature vector represents an absolute position relationship of the multiple feature points in the sub-image of the hand region; and outputting a recognition result of the sub-image of the hand region based on the first position feature vector and the second position feature vector, wherein determining the first position feature vector based on the multiple pieces of feature point position information comprises:

obtaining a first feature vector in a first coordinate matrix established based on the multiple pieces of feature point position information; and processing the first feature vector by using a first multi-layer perceptron to obtain the first position feature vector.

18. The non-transitory computer-readable storage medium according to claim 17, wherein the first feature vector corresponds to a maximum feature value of the first coordinate matrix.

19. The non-transitory computer-readable storage medium according to claim 18, wherein an element in the first coordinate matrix is a Euclidean distance between any one of the multiple feature points and any one of remaining feature points in the multiple feature points.

20. The non-transitory computer-readable storage medium according to claim 18, wherein the first coordinate matrix is an upper triangular matrix.

* * * * *